US011318931B2

(12) United States Patent
Murray et al.

(10) Patent No.: US 11,318,931 B2
(45) Date of Patent: May 3, 2022

(54) VEHICLE PARK ASSIST

(71) Applicant: Ford Global Technologies, LLC, Dearborn, MI (US)

(72) Inventors: James Nicholas Murray, Chelmsford (GB); Ben Moffatt, Iver Heath (GB)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 16/891,140

(22) Filed: Jun. 3, 2020

(65) Prior Publication Data

US 2020/0384984 A1 Dec. 10, 2020

(30) Foreign Application Priority Data

Jun. 4, 2019 (GB) ...................................... 1907966

(51) Int. Cl.
*B60Q 1/00* (2006.01)
*B60W 30/06* (2006.01)
*B60W 50/14* (2020.01)

(52) U.S. Cl.
CPC ............ *B60W 30/06* (2013.01); *B60W 50/14* (2013.01); *B60W 2554/801* (2020.02); *B60W 2554/802* (2020.02)

(58) Field of Classification Search
CPC ................. B60W 30/06; B60W 50/14; B60W 2554/801; B60W 2554/802; B60W 2540/049; B60W 2530/10; B60W 30/08; B62D 15/027; B62D 15/028; B62D 15/029

USPC .......................... 340/435, 436, 903, 988, 904
See application file for complete search history.

(56) References Cited

U.S. PATENT DOCUMENTS

| 8,370,021 | B2 * | 2/2013 | Okada ..................... E05F 15/43 701/36 |
|---|---|---|---|
| 2003/0128137 | A1 | 7/2003 | Hoetzel et al. |
| 2006/0235615 | A1 | 10/2006 | Kato et al. |
| 2010/0214872 | A1 | 8/2010 | Schmid et al. |
| 2012/0013485 | A1 | 1/2012 | Pampus et al. |
| 2013/0113614 | A1 * | 5/2013 | Yopp ....................... B60Q 9/00 340/438 |
| 2014/0244073 | A1 * | 8/2014 | Okamura ............... G05D 1/021 701/2 |
| 2017/0072850 | A1 * | 3/2017 | Curtis .................... G08G 1/168 |
| 2017/0334353 | A1 | 11/2017 | Gillott et al. |
| 2021/0293572 | A1 * | 9/2021 | Konrardy ........... G01C 21/3697 |

OTHER PUBLICATIONS

Search Report as issued by the Great Britain Intellectual Property Office dated Dec. 6, 2019.

* cited by examiner

*Primary Examiner* — Anh V La
(74) *Attorney, Agent, or Firm* — Frank A. MacKenzie; Bejin Bieneman PLC

(57) ABSTRACT

One or more parking sensors are configured to determine a distance between a vehicle and an obstacle. A controller is configured to determine a threshold parking distance based on an operating mode of the vehicle; compare the determined distance with the threshold parking distance; and provide an indication to a user of the vehicle based on the determined distance being less than or equal to the threshold parking distance.

20 Claims, 5 Drawing Sheets

VEHICLE PARK ASSIST

CROSS-REFERENCE TO RELATED APPLICATIONS

This patent application claims priority to Great Britain patent application No. 1907966.4, filed Jun. 4, 2019, which is hereby incorporated herein by its reference in its entirety.

BACKGROUND

Motor vehicles often comprise a parking assistance system that is active when the driver is parking or manoeuvring the vehicle. The parking assistance system comprises parking sensors that detect obstacles around the vehicle and the system is configured to warn the driver when the vehicle is in danger of colliding with the obstacles. The warnings provided by parking assistance system can be referred to by the driver in order to park close to an obstacle without colliding with it.

However, when the motor vehicle is being used for particular purposes, it may be desirable to leave additional space between the vehicle and obstacles around the vehicle.

SUMMARY

The present disclosure relates to a parking assistance system for a motor vehicle including a parking assistance system that varies its operation based on an expected use of the motor vehicle.

According to an aspect of the present disclosure, there is provided a parking assistance system for a motor vehicle, the system comprises:
  one or more parking sensors configured to determine a distance between the vehicle and an obstacle; and
  a controller configured to:
    determine an operating mode of the vehicle based on a time of day;
    determine a threshold parking distance, wherein the threshold parking distance is determined according to the operating mode of the motor vehicle;
    compare the determined distance with the threshold parking distance; and
    provide an indication to a user of the vehicle if the vehicle is at or within the threshold parking distance of the obstacle.

For example, if the time of day is earlier than a predetermined time, the first operating mode may be selected and if the time of day is later than the predetermined time, the second operating mode may be selected. Alternatively, if the time of day is later than a first predetermined time and earlier than a second predetermined time, the first operating mode may be selected. Otherwise, the second operating mode may be selected.

The operating mode may be selected from a first operating mode and a second operating mode. The threshold parking distance may be set to a first distance when the vehicle is operating in the first operating mode and a second distance when the vehicle is operating in the second operating mode. The second distance may be greater than the first distance.

The controller may be configured to determine an expected use of the motor vehicle, e.g. based on the time of day. The expected use of the motor vehicle may be selected from a first use, when the vehicle is transporting, e.g., making one or more collections or deliveries of, passengers or cargo, and a second use, when the vehicle is not making a collection or delivery, e.g., is being used as a means of personal transportation and/or is being returned to a place where the vehicle is kept.

The controller may be configured to determine the operating mode based on the expected use of the motor vehicle. For example, if it is expected that the vehicle is being used to transport passengers and/or cargo, the first operating mode of the vehicle may be selected. Otherwise, e.g., if it is expected that the vehicle is not being used to transport passengers and/or cargo, the second operating mode may be selected.

The controller may be configured to determine the expected use of the motor vehicle based on a calendar event in a user's calendar accessible to the controller.

The parking assistance system may further comprise one or more sensors configured to determine an occupancy and/or cargo loading of the motor vehicle. The controller may be configured to determine the expected use of the motor vehicle based on the occupancy and/or cargo loading of the motor vehicle.

The first distance may be a distance at which a door of the vehicle, e.g., that opens in a direction of the obstacle, can be opened, e.g., fully opened, without being restricted by an obstacle positioned at the first distance from the vehicle.

The second distance may be a distance at which a door of the vehicle, e.g., that opens in the direction of the obstacle, is restricted from being opened, e.g., fully opened, by an obstacle positioned at the second distance from the vehicle.

The controller may be further configured to compare the determined distance with a further threshold parking distance. The controller may be configured to provide a further indication to the user of the vehicle when the vehicle is at or within the further threshold parking distance.

The further indication may differ from the indication, such that the further indication can be distinguished from the indication by the user of the vehicle. For example, the indication may be a visual indication, e.g., provided by illuminating a light or display screen, and the further indication may be an audio indication, provided using a speaker of the vehicle, or vice versa. Additionally or alternatively, the further indication may be distinguishable from the indication by one or more of a sound, tone, rhythm, colour and frequency of the indication.

The operating mode may be selectable by the user of the motor vehicle.

The controller may be configured to determine which of the doors of the vehicle are expected be opened in order to load or unload passengers or cargo from the vehicle. The threshold parking distance may be set based on the door of the vehicle expected to be opened, e.g., based on the distance that the door expected to be opened protrudes from the body of the vehicle when the door is open.

The controller may be configured to determine which of the doors of the vehicle opens in the direction of the obstacle from the vehicle. The threshold parking distance may be determined, e.g., by the controller, based on a distance that the door of the vehicle opens in the direction of the obstacle.

A motor vehicle may comprise the above-mentioned parking assistance system.

According to another aspect of the present disclosure, there is provided a method, e.g., a computer implemented method, for a parking assistance system of a motor vehicle, e.g., to be performed by a controller of the parking assistance system, wherein the method comprises:
  determining a distance between the vehicle and an obstacle;

determining an operating mode of the vehicle based on a time of day;

determining a threshold parking distance, wherein the threshold parking distance is determined according to the operating mode of the motor vehicle;

comparing the determined distance with the threshold parking distance; and providing an indication to a user of the vehicle if the vehicle is at or within the threshold parking distance from the obstacle.

The method may further comprise selecting the operating mode from a first operating mode and a second operating mode. The threshold parking distance may be a first distance when the vehicle is operating in the first operating mode and a second distance when the vehicle is operating in the second operating mode. The first distance may be greater than the second distance.

The method may comprise determining an expected use of the motor vehicle. The method may further comprise determining the operating mode of the vehicle based on the expected use of the motor vehicle.

The method may comprise comparing the determined distance with a further threshold parking distance. The method may further comprise providing a further indication to the user of the vehicle if the vehicle is at or within the further threshold parking distance of the obstacle. The further threshold parking distance may be less than the threshold parking distance.

The method may comprise determining which of the doors of the vehicle are expected be opened in order to load or unload passengers or cargo from the vehicle. The method may further comprise setting the threshold parking distance based on the door of the vehicle expected to be opened.

The method may comprise determining which of the doors of the vehicle opens in the direction of the obstacle from the vehicle. The method may further comprise setting the threshold parking distance based on a distance that the door of the vehicle opens in the direction of the obstacle.

According to another aspect of the present disclosure, there is provided a parking assistance system for a motor vehicle, wherein the system comprises:

one or more parking sensors configured to determine a distance between a vehicle and an obstacle; and a controller configured to:
  determine an expected use of the vehicle based on a calendar event in a user's calendar;
  determine an operating mode based on the expected use;
  determine a threshold parking distance based on the operating mode;
  compare the determined distance with the threshold parking distance; and
  provide an indication to the user of the vehicle based on the determined distance being less than or equal to the threshold parking distance.

To avoid unnecessary duplication of effort and repetition of text in the specification, certain features are described in relation to only one or several aspects of the disclosure. However, it is to be understood that, where it is technically possible, features described in relation to any aspect of the disclosure may also be used with any other aspect of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
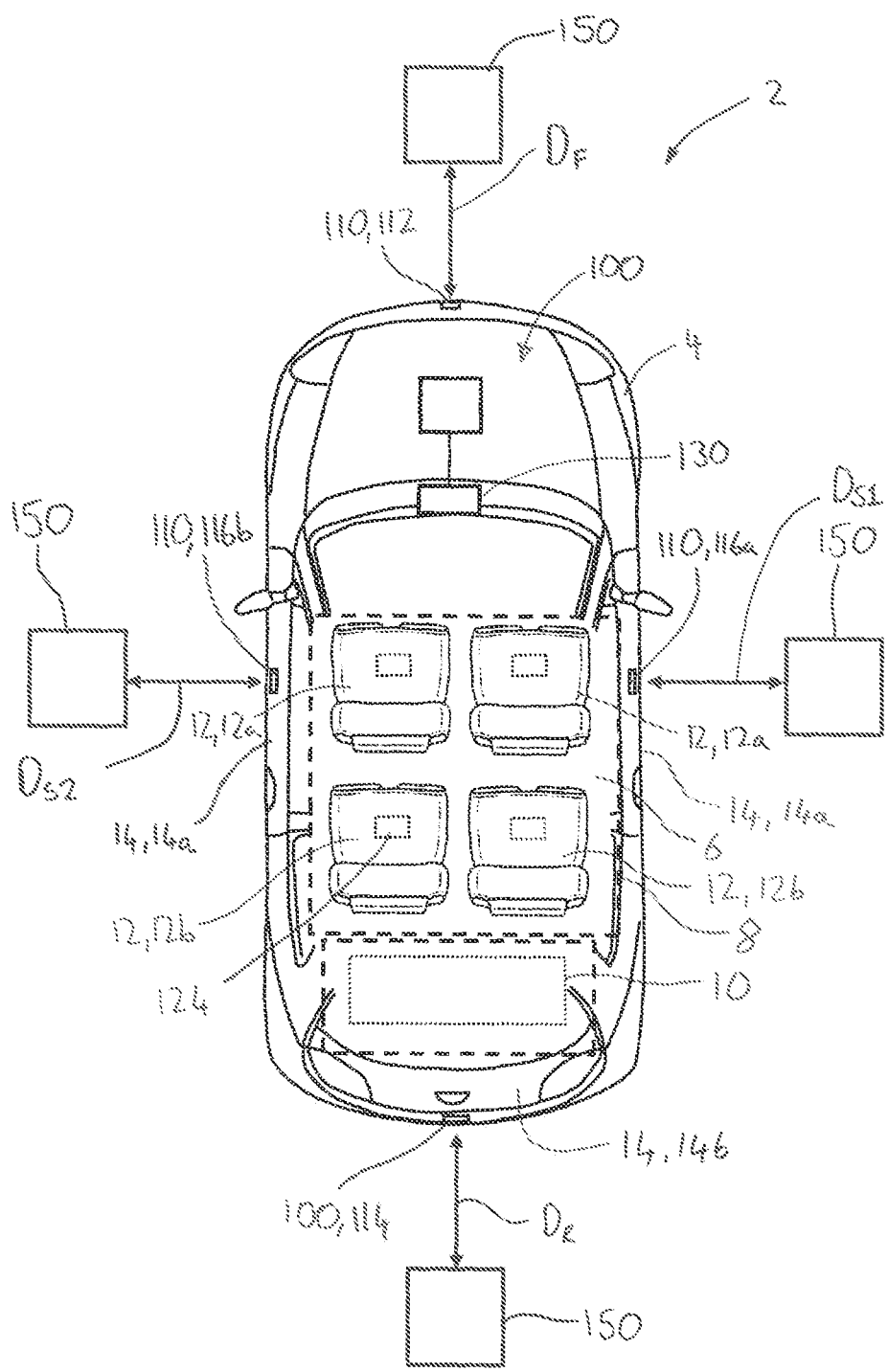
FIG. 1 is a schematic plan view of a motor vehicle comprising a parking assistance system according to the present disclosure.

With reference to FIG. 1, a motor vehicle 2 comprises a body 4 which defines an interior 6 of the motor vehicle 2. The interior 6 may comprise a passenger space 8 and a cargo space 10. One or more seats 12 may be arranged within the passenger space 8 for occupants of the vehicle 2. For example, the vehicle 2 may comprise a driver's seat 12a and may further comprise one or more passenger seats 12b.

The motor vehicle 2 further comprises a plurality of doors 14 for providing access into the passenger and cargo spaces 8, 10. For example, the motor vehicle 2 may comprise one or more passenger doors 14a for occupants to enter and exit the passenger space 8, and a boot, or trunk, door 14b for providing access to the cargo space 10, e.g., for loading and unloading items of cargo to and from the vehicle 2. As depicted in FIG. 1, the passenger doors 14a are provided on the sides of the vehicle body 4 towards the front of the interior space 6, and the boot door 14b is provided at the rear of the vehicle body 4. In other arrangements, the motor vehicle 2 may comprise additional or alternative doors 14 for providing access into the passenger and/or cargo spaces 8, 10. For example, the vehicle 2 may comprise additional passenger doors 14a, e.g., arranged rearwards of the passenger doors 14a on the vehicle 2, for providing access to the rear of the passenger space 8 and/or a side door 14 for providing access to the cargo space 10.

The motor vehicle 2 may further comprise a parking assistance system 100 according to the present disclosure. The parking assistance system 100 comprises a plurality of parking sensors 110 configured to determine the distance between the vehicle 2 and any obstacles 150 positioned around the vehicle 2, and a controller 120 configured to control the operation of the parking assistance system 100.

As depicted, the parking assistance system 100 may comprise a front parking sensor 112 configured to determine a forward distance $D_F$ between the vehicle 2 and an obstacle 150 positioned in front of the vehicle 2, a rear parking sensor 114 configured to determine a rearward distance $D_R$ between the vehicle 2 and an obstacle 150 positioned to the rear of the vehicle 2, and side parking sensors 116a, 116b provided on either side of the vehicle 2 and configured to determine side distances $D_{S1}$, $D_{S2}$ between the vehicle 2 and obstacles 150 positioned to the respective sides of the vehicle 2.

The controller 120 may be configured to receive the distances determined by the parking sensors 110 and may provide parking distance indications to a user of the vehicle 2 based on the distances. The controller 120 may be a dedicated controller of the parking assistance system 100 or may be provided as part of another system of the motor vehicle 2. For example, the controller 120 may be an engine control unit, powertrain control unit, or body control unit of the motor vehicle 2.

The parking assistance system 100 may comprise one or more indicating devices 130, such as lights, display screens, and/or speakers, for providing the parking distance indications to the user. Additionally or alternatively, the parking assistance system 100 may operate devices, e.g., user interface devices, provided as part of another system of the vehicle 2 in order to provide the parking distance indications to the user. For example, the parking assistance system 100 may operate a display screen or speakers provided as part of an entertainment system of the motor vehicle 2 in order to provide the parking distance indications.

The controller 120 may be configured to control the operation of the parking assistance system 100 and indicating devices 130 according to an operating mode of the parking assistance system 100 and/or the motor vehicle 2, as described below.

The user of the vehicle 2 may use the vehicle 2 for a plurality of different purposes. For example, the user may use the vehicle 2 as a means of personal transportation or for transporting passengers and/or cargo. The purpose that the user is using the vehicle 2 for may vary between different journeys made in the vehicle 2. Additionally, the purpose for which the vehicle 2 is being used may vary during the course of a particular journey. For example, the user may be using the vehicle 2 to transport one or more passengers and/or items of cargo, and may make one or more collections and/or deliveries during a journey, before travelling back to where the vehicle 2 is kept after one, more than one or all of the collections and deliveries have been made.

Figure 2A:
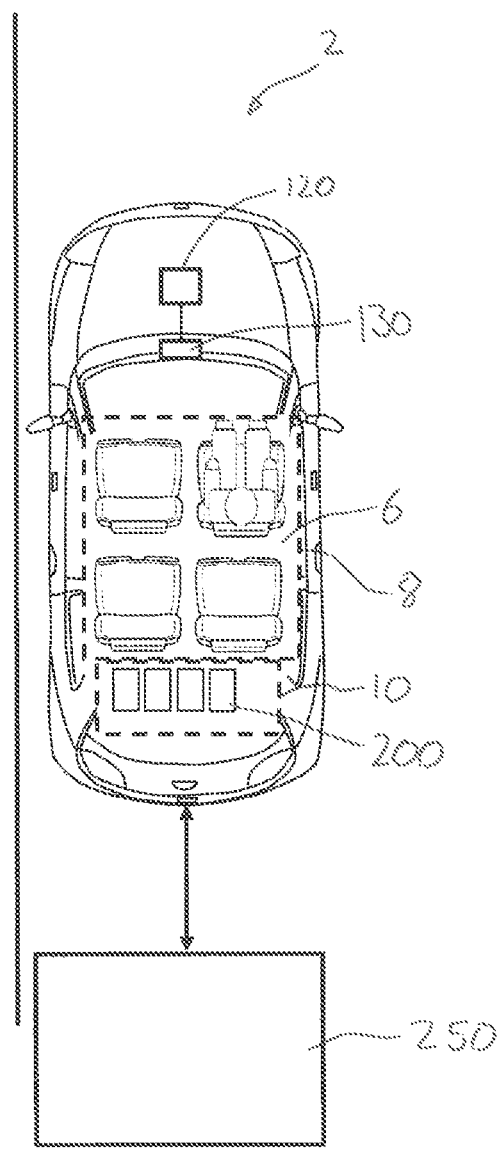
FIGS. 2a and 2b are a schematic plan views of the motor vehicle, in first and second parking situations respectively.

FIG. 2a depicts an arrangement in which the vehicle 2 is being used for transporting items of cargo 200 that have been loaded into the cargo space 8 within the vehicle interior 6. In this case, the vehicle 2 may be considered to be operating in a delivery mode. In some arrangements, the delivery mode may be a mode of the vehicle 2 that can be selected by the user.

When the vehicle 2 is being used for transporting cargo 200 or is operating in the delivery mode, the user may wish to park the vehicle 2 relative to an obstacle 250 such that sufficient space is provided between the vehicle 2, e.g., one or more doors 14 of the vehicle 2 that may be used to load and/or unload the cargo 200, and the obstacle 250 to facilitate loading and unloading of the items of cargo 200. As depicted in FIG. 2a, the obstacle 250 is positioned to the rear of the vehicle 2. However, in other arrangements, the obstacle 250 may be positioned away from the vehicle 2 in any other direction.

When the vehicle 2 is being used for transporting cargo 200, the parking assistance system 100 may operate in a first operating mode. When the parking assistance system 100 is operating in the first operating mode and/or the vehicle 2 is operating in the delivery mode, the controller 120 may be configured to compare the distances determined by the parking sensors 110 with a first threshold parking distance. The controller 120 may provide a parking distance indication to the user if the vehicle 2 is at or within the first threshold parking distance of the obstacle 250, e.g. if the distance determined by the parking sensor 110 is less than or equal to the first threshold parking distance.

Providing the parking distance indication may comprise illuminating a light visible to the user, displaying a message or image on a display screen of the vehicle 2, and/or playing an audible indication, such as a sound or a verbal instruction that the vehicle 2 is positioned at or within the first threshold parking distance from the obstacle 250.

The controller 120 may be configured to determine a direction of the obstacle 250 at or within the first threshold parking distance from the vehicle 2. The indication may indicate the direction of the obstacle 250 from the vehicle 2.

The first threshold parking distance may be a distance from the obstacle 250 at which the door 14 of the vehicle 2 adjacent to the obstacle 250 can be opened, e.g., fully opened, without colliding with the obstacle 250.

Figure 2B:
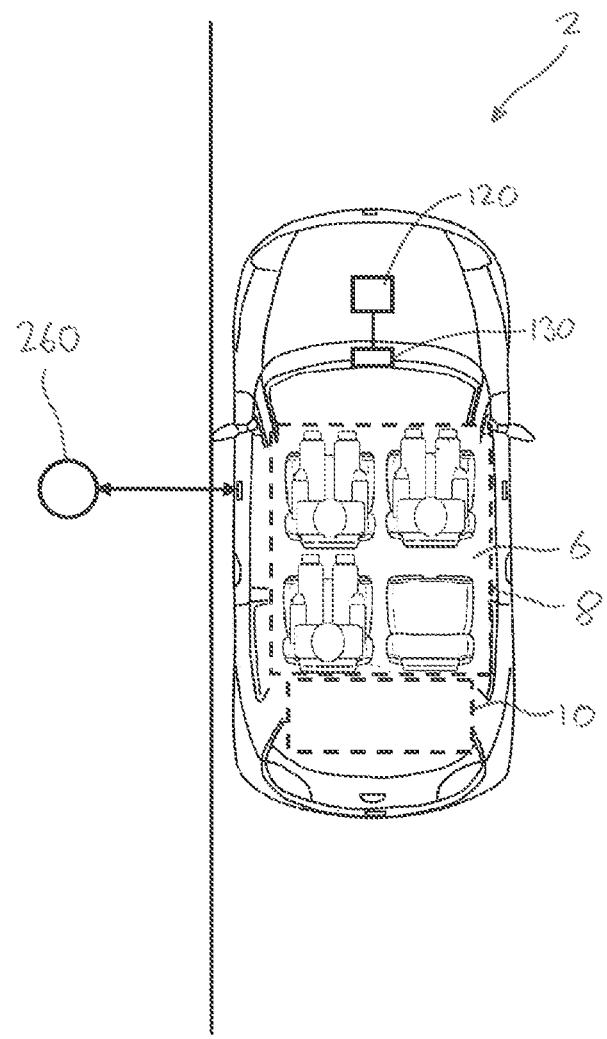

FIG. 2b depicts an arrangement in which the vehicle 2 is being used for transporting passengers. In this case, the vehicle 2 may similarly be considered to be operating in a delivery mode. When the vehicle 2 is being used in this way, the user may similarly wish to park the vehicle 2 relative to an obstacle 260 such that sufficient space is provided between the vehicle 2, e.g., a door 14 of the vehicle 2 to be used by the passengers to enter or exit the vehicle 2, and the obstacle 260. As depicted in FIG. 2b, the obstacle 260 is positioned to the side of the vehicle 2. However, in other arrangements, the obstacle 260 may be positioned away from the vehicle 2 in any other direction.

Accordingly, it may similarly be desirable for the parking assistance system 100 to operate in the first operating mode when the vehicle 2 is transporting passengers. The parking assistance system 100 may thereby operate to provide a parking distance indication to the user when the vehicle 2 is at or within the first threshold parking distance of the obstacle 260. Positioning the vehicle 2 at the first threshold parking distance from the obstacle 260 may allow a passenger door 14a to be opened, e.g., fully opened, to allow the passengers to enter or exit the vehicle 2.

Although in the arrangements shown in FIGS. 2a and 2b, the vehicle 2 is being used to transport cargo 200 and passengers respectively. The vehicle 2 may be used to transport both cargo 200 and passengers and it may be desirable to park the vehicle 2 no closer than the first threshold parking distance from the obstacle 250 to the rear of the vehicle 2 and the obstacle 260 to the side of the vehicle 2.

When the vehicle 2 is being used to transport cargo 200 and/or passengers, it may be desirable for the vehicle 2 to be parked no closer than the first threshold parking distance from one or more obstacles 250, 260 in a respective direction in which one or more doors 14 of the vehicle 2 opens in order to allow the cargo 200 to be loaded or unloaded and/or to allow the passengers to enter or exit the vehicle 2.

In some arrangements, the controller 120 may be configured to determine which of the doors 14 of the vehicle 2 it may be desirable to open in order to load or unload cargo 200 and/or for passengers to enter or exit the vehicle 2. The controller 120 may determine the directions that the doors 14, which are desirable to open, open in. The controller 120 may be configured to determine the distances from the vehicle 2 to one or more obstacles 250, 260 in the determined directions. The controller 120 may compare the determined distances to the first threshold parking distance and may be further configured to provide the parking distance indication when the vehicle 2 is at or within the first threshold parking distance from the obstacles 250, 260, e.g., in the determined directions.

Alternatively, the controller 120 may be configured to provide the parking distance indication when the vehicle 2 is at the first threshold parking distance from, or closer to, an obstacle 250, 260 positioned away from the vehicle 2 in any direction or any direction in which a door 14 of the vehicle 2 opens.

The different doors 14 of the vehicle 2 may protrude different distances from the vehicle body 4 when the doors 14 are open. For example, the passenger doors 14a may protrude sideways from the vehicle 2 by a greater distance than the boot door 14*b* protrudes rearwards from vehicle body 4 when open. The first threshold parking distance considered, e.g., compared, by the controller 120 may therefore vary depending on the direction of the obstacle 250, 260 from the vehicle 2 and the configuration of the door 14 of the vehicle 2 that opens in the direction. For example, the controller 120 may be configured to determine a distance that a door 14 of the vehicle 2 protrudes from the vehicle 2 in a particular direction, e.g., by referring to door 14 data stored in a memory associated with the controller 120. The controller 120 may be configured to determine which of the doors 14 opens in the direction of the obstacle 250, 260. The first threshold parking distance may be based on the distance that the determined door 14 protrudes. Alternatively, the first threshold parking distance may be set to be the greatest distance by which any of the doors 14 of the vehicle 2 protrudes from the body 4 of the vehicle 2 when the door 14 is open.

Figure 3:
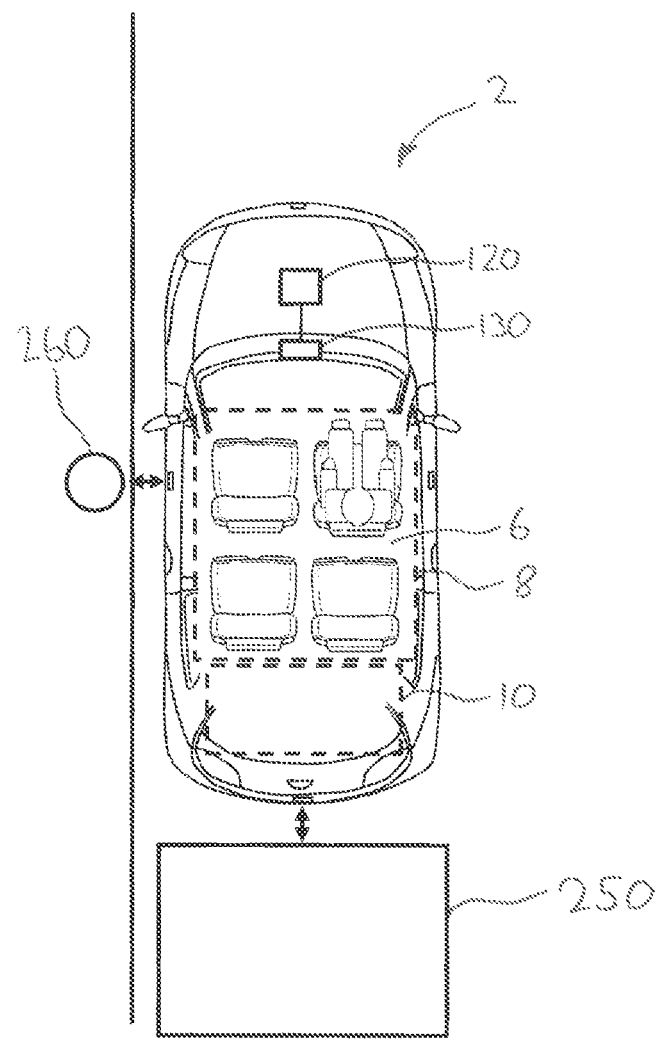
FIG. 3 is a schematic plan view of the motor vehicle, in a third parking situation.

With reference to FIG. 3, the vehicle 2 may be used as a means of personal transportation and/or for journeys during which passengers and cargo 200 are not to be collected or delivered. In such cases the vehicle 2 may be considered to be operating in a non-delivery mode. The non-delivery mode may be a mode that can be selected by the user of the vehicle 2.

When the vehicle 2 is operating in a non-delivery mode, it may be desirable for the vehicle 2 to be parked more closely to obstacles, such as the obstacle 250 and the obstacle 260. Parking the vehicle 2 closer to an obstacle 250, 260 may enable the vehicle 2 to fit into a smaller space and may allow more vehicles 2 to be parked in a particular parking area. Furthermore, parking the vehicle 2 closer to obstacles 250, 260 may restrict one or more doors 14 of the vehicle 2 from being opened, e.g., fully opened, due to the door 14 colliding with the obstacle 250, 260. Parking the vehicle 2 closer to an obstacle 250, 260 may thereby improve the security of the vehicle 2 by restricting one or more doors 14 of the vehicle 2 from being opened whilst the vehicle 2 is parked.

When it is desirable for the vehicle 2 to be parked closer to obstacles 250, 260 around the vehicle 2, the parking assistance system 100 may be operated in a second operating mode. In the second operating mode, the controller 120 may be configured to provide the parking distance indication to the user when the vehicle 2 is at or within a second threshold parking distance of an obstacle 250, 260 adjacent to the vehicle 2. In particular, the controller 120 may be configured to compare the distances determine by the parking sensors 110 to the second threshold parking distance and may provide the parking distance indication to the user if the distance is less than or equal to the second threshold parking distance.

The second threshold parking distance may be less than the first threshold parking distance. The second threshold parking distance may be a distance at which the door 14 of the vehicle 2 adjacent to the obstacle 250, 260 is prevented from being opened, e.g., fully opened, due to the presence of the obstacle 250, 260. As described above, the doors 14 may protrude for the vehicle 2 by different amounts when open. The distance at which the door 14 of the vehicle 2 adjacent to the obstacle 250, 260 is prevented from being opened may therefore depend of which of the doors 14 of the vehicle 2 opens in the direction of the obstacle 250, 260. The second threshold parking distance applied, e.g., compared, by the controller 120 may therefore vary depending on the door 14 of the vehicle 2 that opens in the direction of the obstacle 250, 260. Alternatively, the second threshold parking distance may be set as a distance at which none of the doors 14 of the vehicle 2 can be opened without colliding with an obstacle 250, 260 at that distance from the vehicle 2.

A user may select the operating mode of the motor vehicle 2 or the parking assistance system 100, e.g., according to the distance they wish to park from obstacles 250, 260 around the vehicle 2. The user may select the operating mode depending on the use they are making of the vehicle 2. For example, if the user is intending to load and/or unload cargo 200 or passengers from the vehicle 2, the user may select the delivery mode of the vehicle 2 or the first operating mode of the parking assistance system 100, and if the user is not expecting to load and/or unload cargo 200 or passengers from the vehicle 2, the user may select the non-delivery mode of the vehicle 2 or the second operating mode of the parking assistance system 100.

Additionally or alternatively, the controller 120 may be configured to determine an expected use of the motor vehicle 2, and may select the operating mode of the parking assistance system 100 accordingly to the anticipate use. For example, if the controller 120 anticipates that the vehicle 2 is to be used for transporting cargo 200 and/or passengers, e.g., such that cargo 200 and/or passengers will be loaded/unloaded and/or enter/exit the vehicle 2, the controller 120 may select the first operating mode. If the controller 120 anticipates that the vehicle 2 is not to be used for transporting cargo 200 and/or passengers, the controller 120 may select the second operating mode.

The controller 120 may be configured to determine the expected use of the vehicle 2 according to the time of day that the vehicle 2 is being used. For example, if the vehicle 2 is being used between day time hours, e.g., between 0900 and 1700 hours, the controller 120 may anticipate that the vehicle 2 is to be used for transporting cargo 200 and/or passengers, and if the vehicle 2 is being used outside of day time hours, the controller 120 may anticipate that the vehicle 2 is not being used for transporting cargo 200 and/or passengers. The day time hours considered by the controller 120 may be predetermined day time hours and/or may be selected or changed by the user, e.g., according to their normal working hours or normal use times of the vehicle 2.

Additionally or alternatively, the controller 120 may be configured to determine the expected use of the vehicle 2 according to a loading of the vehicle 2, e.g., according to whether passengers and/or cargo 200 are currently loaded onto the vehicle 2. In particular, the controller 120 may anticipate that the vehicle 2 is being used to transport cargo 200 and/or passengers if cargo 200 and/or passengers are currently loaded on the vehicle 2.

Returning to FIG. 1, the parking assistance system 100 may comprise one or more sensors 124 configured to determine whether passengers and/or cargo 200 are currently loaded onto the vehicle 2. As depicted, the sensors 124 may comprise weight sensors provided in the seats 12 of the vehicle 2 and/or in a floor of the cargo space 10. Additionally or alternatively, the sensors 124 may comprise one or more distance sensors, such as ultra sound distance sensors, and/or one or more image capture sensors, such as a camera. The controller 120 may be configured to determine whether any passengers and/or cargo 200 are currently loaded onto the vehicle 2 based on data, e.g., measurements or images, from the sensors 124.

When the parking assistance system 100 comprises the one or more sensors 124, the controller 120 may determine which of the doors 14 of the vehicle 2 may be opened to load or unload cargo 200 and/or passengers from the vehicle 2 based on the data from the sensors 124, e.g., based on where the cargo 200 and/or passengers are positioned within the vehicle 2 relative to the doors 14. The controller 120 may be configured to provide the parking distance indication when the vehicle 2 is at or within the first threshold parking distance from an obstacle 250, 260 in a direction in which one of the doors 14 to be opened opens. For example, the controller 120 may determine the distance of an obstacle 250, 260 from the vehicle 2 in a direction in which one of the doors 14 is to be opened.

In some arrangements, the controller 120 may be provided with access to a calendar, e.g., an electronic calendar, of the user. The calendar may be stored on a portable electronic device carried by the user, such as a smart phone or computer, e.g., tablet computer. The controller 120 may access the portable electronic device, e.g., using a wireless communication system, such as Bluetooth(RTM) or WiFi (RTM). Additionally or alternatively, the calendar may be stored in a memory of the vehicle 2, e.g., accessible to the controller 120. Additionally or alternatively again, the calendar may be stored on a network storage system or cloud storage system accessible to the portable electronic device and/or the controller 120.

The controller 120 may determine the expected use of the vehicle 2 based on one or more calendar events recorded in the user's calendar. For example, the calendar may include events indicating cargo/passenger collection times and/or may include events indicating the working hours of the user.

The controller 120 may be configured to select the operating mode of the parking assistance system 100 based on the events recorded in the calendar. For example, the controller 120 may select the first operating mode when collection and/or delivery events are schedules, e.g., between the times of collection and delivery events. Additionally or alternatively, the controller 120 may select the first operating mode when the time of day is within the working hours of the driver, as indicated by the events recorded in the calendar.

In addition to providing the parking distance indication to the user, it may be desirable for the parking assistance system 100 to provide a further indication alerting the user to a potential collision of the vehicle 2 with an obstacle 250, 260 adjacent to the vehicle 2. The controller 120 may be configured to compare the distances received from the parking sensors 110 to a further threshold parking distance. The controller 120 may be configured to provide the further indication to the user when the vehicle 2 is at or within the further threshold parking distance from an obstacle 250, 260 adjacent to the vehicle 2. The further threshold parking distance may be less than the first and second threshold parking distances.

The further indication may be different from the parking distance indication, such that the further indication can be distinguished from the parking distance indication by the user.

The form of the further indication may differ from the form of the parking distance indication. For example, the parking distance indication may be a visual indication, e.g., provided by illuminating a light or displaying a message on a display screen, and the further indication may be an audio indication, provided using a speaker of the vehicle 2. Additionally or alternatively, the further indication may be distinguishable from the parking distance indication by one or more of the content of a visual or audio message, tone, volume, rhythm, colour and frequency of the indication. For example, the parking distance indication and further indications may be periodic tones having different frequencies to one another.

Figure 4:
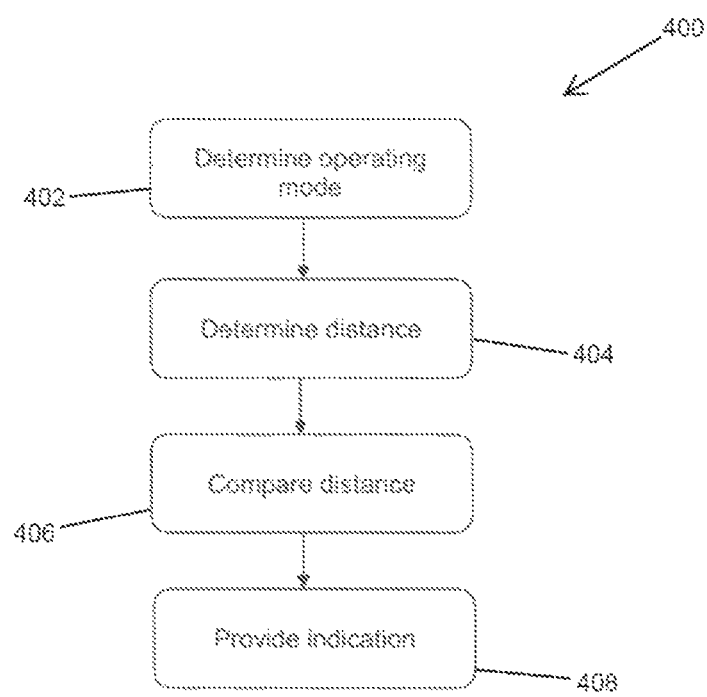
FIG. 4 is a flow chart illustrating a method of operating a parking assistance system according to the present disclosure.

With reference to FIG. 4, the controller 120 may be configured to operate the parking assistance system 100 according to a method 400. The method comprises a first step 404, in which a distance between the vehicle 2 and an obstacle 250, 260 is determined. The method further comprises a second step 406, in which the distance between the vehicle 2 and the obstacle 250, 260 is compared to a threshold parking distance. The method further comprises a third step 408, in which an indication is provided to a user of the vehicle 2 when the vehicle 2 is at or within the threshold parking distance from the obstacle 250, 260. As described above, the threshold parking distance is determined according to the operating mode of the parking assistance system 100 or the motor vehicle 2.

The method may further comprise an initial step 402, in which the operating mode of the parking assistance system 100 is determined. As described above, the operating mode may be set by the user or may be determined according to the time of day or expected use of the motor vehicle 2.

As described above, the first and second threshold parking distances applied by the controller 120 may vary depending on which of the doors 14 of the vehicle 2 opens in the direction of the obstacle 250, 260. The method 400 may comprise a further step in which the door 14 of the vehicle 2 to be opened in the direction of the obstacle 250, 260 is determined. The distance that the door 14 protrudes in the direction of the obstacle 250, 260 may be determined, e.g., by referring to door 14 data stored in a memory of the parking assistance system 100. The first or second threshold parking distance may be determined according to the door 14 of the vehicle 2 to be opened, e.g., according to the distance it protrudes.

When the vehicle 2 is operating in the delivery mode, or the parking assistance system 100 is operating the first operating mode, the method 400 may further comprise determining which of the doors 14 may be opened in order to load and/or unload passengers and/or cargo 200 from the vehicle 2. The parking distance indication may be provided when the vehicle 2 is at or within the first threshold parking distance of an obstacle 250, 260 in the direction in which one of the doors 14 to be opened opens.

The method 400 may further comprise comparing the distance between the vehicle 2 and the obstacle 250, 260 to a further threshold distance. A further indication may be provided to a user of the vehicle 2 if the vehicle 2 is at or within the further threshold distance from the obstacle 250, 260. As described above, the further indication may be different from the parking distance indication such that the further indication can be distinguished from the parking distance indication by the user.

The invention claimed is:

1. A system comprising:
one or more parking sensors configured to determine a distance between a vehicle and an obstacle; and
a controller configured to:
determine a parking assistance operating mode of the vehicle based on a time of day;
determine a threshold parking distance based on the parking assistance operating mode;
compare the determined distance with the threshold parking distance; and
provide an indication to a user of the vehicle based on the determined distance being less than or equal to the threshold parking distance.

2. The system of claim 1, wherein the parking assistance operating mode is selected from a first operating mode and a second operating mode, wherein the threshold parking distance is set to a first distance when the vehicle is operating in the first operating mode and a second distance when the vehicle is operating in the second operating mode, the second distance being greater than the first distance.

3. The system of claim 2, wherein the first distance is a distance at which a door of the vehicle can be opened without being restricted by the obstacle positioned at the first distance from the vehicle.

4. The system of claim 2, wherein the second distance is a distance at which a door of the vehicle is restricted from being opened by the obstacle positioned at the second distance from the vehicle.

5. The system of claim 1, wherein the controller is further configured to:
   determine an expected use of the vehicle; and
   determine the parking assistance operating mode additionally based on the expected use of the vehicle.

6. The system of claim 5, wherein controller is further configured to determine the expected use of the vehicle based on a calendar event in a user's calendar.

7. The system of claim 5, further comprising:
   one or more sensors configured to determine at least one of an occupancy and cargo loading of the vehicle, and wherein the controller is further configured to:
   determine the expected use of the vehicle based on the at least one of the occupancy and cargo loading of the vehicle.

8. The system of claim 1, wherein the controller is further configured to:
   compare the determined distance to a further threshold parking distance; and
   provide a further indication to the user of the vehicle based on the determined distance being less than or equal to the further threshold parking distance, wherein the further threshold parking distance is less than the threshold parking distance.

9. The system of claim 8, wherein the further indication differs from the indication, such that the further indication can be distinguished from the indication.

10. The system of claim 1, wherein the parking assistance operating mode is selectable by the user of the vehicle.

11. The system of claim 1, wherein the controller is further configured to:
    determine one or more doors of the vehicle expected be opened based on at least one of passengers and cargo in the vehicle, wherein the threshold parking distance is set based on the one or more doors of the vehicle expected to be opened.

12. The system of any of claim 1, wherein the controller is further configured to:
    determine a door of the vehicle opens in a direction from the vehicle to the obstacle, wherein the threshold parking distance is determined based on a distance that the door of the vehicle opens in the direction.

13. A method, comprising:
    determining a distance between a vehicle and an obstacle;
    determining a parking assistance operating mode of the vehicle based on a time of day;
    determining a threshold parking distance based on the parking assistance operating mode;
    comparing the determined distance with the threshold parking distance; and
    providing an indication to a user of the vehicle based on the determined distance being less than or equal to the threshold parking distance.

14. The method of claim 13, further comprising selecting the parking assistance operating mode from a first operating mode and a second operating mode, wherein the threshold parking distance is a first distance when the vehicle is operating in the first operating mode and a second distance when the vehicle is operating in the second operating mode, the second distance being greater than the first distance.

15. The method of claim 13, further comprising:
    determining an expected use of the vehicle; and
    determining the parking assistance operating mode of the vehicle additionally based on the expected use of the vehicle.

16. The method of claim 15, further comprising determining the expected use of the vehicle based on a calendar event in a user's calendar.

17. The method of claim 13, further comprising:
    comparing the determined distance to a further threshold parking distance; and
    providing a further indication to the user of the vehicle based on the determined distance being less than or equal to the further threshold parking distance, wherein the further threshold parking distance is less than the threshold parking distance.

18. The method of claim 13, further comprising:
    determining one or more doors of the vehicle expected to be opened based on at least one of passengers and cargo in the vehicle; and
    setting the threshold parking distance based on the door of the vehicle expected to be opened.

19. The method of claim 13, further comprising:
    determining a door of the vehicle opens in a direction from the vehicle to the obstacle; and
    setting the threshold parking distance based on a distance that the door of the vehicle opens in the direction.

20. A system comprising:
    one or more parking sensors configured to determine a distance between a vehicle and an obstacle; and
    a controller configured to:
    determine an expected use of the vehicle based on a calendar event in a user's calendar;
    determine a parking assistance operating mode based on the expected use;
    determine a threshold parking distance based on the parking assistance operating mode;
    compare the determined distance with the threshold parking distance; and
    provide an indication to the user of the vehicle based on the determined distance being less than or equal to the threshold parking distance.

* * * * *